US009853992B1

(12) United States Patent
Kumar et al.

(10) Patent No.: US 9,853,992 B1
(45) Date of Patent: Dec. 26, 2017

(54) CLOUD SERVICE USAGE RISK ANALYSIS BASED ON USER LOCATION

(71) Applicant: Skyhigh Networks, Inc., Campbell, CA (US)

(72) Inventors: Santosh Raghuram Kumar, Mountain View, CA (US); Sandeep Chandana, Fremont, CA (US); Sekhar Sarukkai, Cupertino, CA (US); Satyanarayana Vummidi, Sunnyvale, CA (US)

(73) Assignee: Skyhigh Networks, Inc, Campbell, CA (US)

( * ) Notice: Subject to any disclaimer, the term of this patent is extended or adjusted under 35 U.S.C. 154(b) by 54 days.

(21) Appl. No.: 15/144,335

(22) Filed: May 2, 2016

(51) Int. Cl.
*H04L 29/06* (2006.01)
*H04L 29/08* (2006.01)

(52) U.S. Cl.
CPC .......... *H04L 63/1425* (2013.01); *H04L 67/18* (2013.01); *H04L 67/22* (2013.01)

(58) Field of Classification Search
CPC ......... H04L 41/14; H04L 67/22; H04L 67/10; H04L 63/1433
See application file for complete search history.

(56) References Cited

U.S. PATENT DOCUMENTS

| | | | | |
|---|---|---|---|---|
| 9,203,847 B2* | 12/2015 | Elleboe | ................. | H04L 63/101 |
| 2006/0007858 A1* | 1/2006 | Fingerhut | ............... | H04L 41/12 |
| | | | | 370/229 |
| 2008/0307219 A1* | 12/2008 | Karandikar | ........... | H04L 63/166 |
| | | | | 713/153 |
| 2012/0226796 A1* | 9/2012 | Morgan | .............. | H04L 12/1453 |
| | | | | 709/224 |
| 2012/0303739 A1* | 11/2012 | Ferris | ...................... | H04L 67/06 |
| | | | | 709/217 |
| 2014/0259190 A1* | 9/2014 | Kiang | ................. | G06F 21/6218 |
| | | | | 726/30 |
| 2016/0261683 A1* | 9/2016 | Ferris | ...................... | H04L 67/06 |

OTHER PUBLICATIONS

Muir et al., "Internet geolocation and evasion, School of Computer Science," Carleton University (2006), available at https://www.ccsl.carleton.ca/~jamuir/papers/TR-06-05.pdf.
Shue et al., "From an IP Address to a Street Address: Using Wireless Signals to Locate a Target," 7th USENIX Workshop on Offensive Technologies (WOOT '13) Aug. 13, 2013, available at https://www.usenix.org/conference/woot13/workshop-program/presentation/shue.

\* cited by examiner

*Primary Examiner* — Amir Mehrmanesh
(74) *Attorney, Agent, or Firm* — Van Pelt, Yi & James LLP

(57) ABSTRACT

A system and method for filtering detected anomalies in cloud service usage activities associated with an enterprise uses a trusted location analysis to filter detected anomalies. The locations from which the cloud usage activities are made are analyzed and designated as trusted or non-trusted. The trusted location determination is used to filter the detected anomalies that are associated with trusted locations and therefore may be of low risk. In this manner, actions can be taken only on detected anomalies that are associated with non-trusted locations and therefore may be high risk. The system and method of the present invention enable security incidents, anomalies and threats from cloud activity to be detected, filtered and annotated based on the location heuristics. The trusted location analysis identifies trusted locations automatically using cloud activity usage data and does not rely on potentially unreliable location data from user input.

19 Claims, 4 Drawing Sheets

CLOUD SERVICE USAGE RISK ANALYSIS BASED ON USER LOCATION

BACKGROUND OF THE INVENTION

Cloud computing is the use of computing resources, including hardware and software, that are delivered as a service over a network, typically the Internet. As cloud computing achieves increased popularity and adoption of cloud-based services by businesses increases, concerns over security and risks of using these cloud-based services become significant. Traditionally, systems and software applications were deployed in enterprise environments, such as within an enterprise's own private data network, with strict controls and policies to ensure that data and usage are compliant with the enterprise's standards. However, the adoption of cloud-based services offered by third parties creates a potential mismatch, or complete absence, of expected enterprise level controls. Enterprises are faced with the challenge of accessing risk exposure associated with the use of cloud-based services in order to apply compensating controls.

In particular, an enterprise may adopt the use of one or more cloud-based services to support its business operation. Meanwhile, the users of the enterprise may access these cloud-based services from various locations, at or outside the enterprise's primary business locations. The enterprise is faced with the challenge of accessing risk exposure associated with the use of these cloud-based services where the users of the enterprises are located at a myriad of diverse locations.

BRIEF DESCRIPTION OF THE DRAWINGS

Various embodiments of the invention are disclosed in the following detailed description and the accompanying drawings.

DETAILED DESCRIPTION

Figure 1:
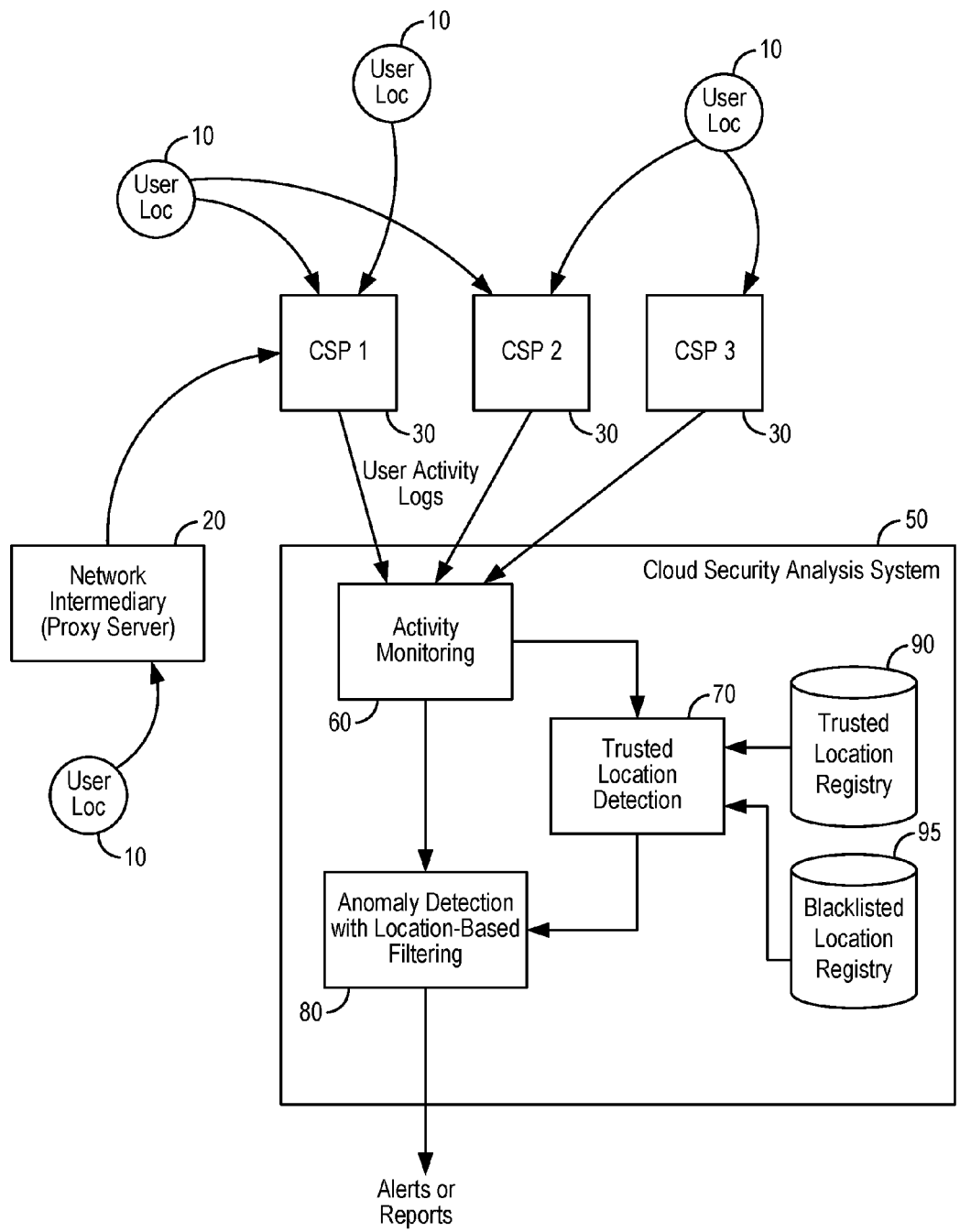
FIG. 1 is a diagram illustrating an environment in which a cloud service usage security analysis system of the present invention can be deployed in some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to embodiments of the present invention, a system and method for detecting anomalies in cloud service usage activities associated with an enterprise uses a trusted location analysis to evaluate or filter detected anomalies. The locations of the user or the user's device from which the cloud usage activities are made are analyzed and designated as trusted or non-trusted. In some embodiments, a trusted location registry is used to store previously identified trusted locations of users of the enterprise. In some embodiments, the trusted location determination is used to filter out the detected anomalies that are associated with trusted locations and therefore may be of low risk. In other embodiments, the trusted location determination is used to evaluate or gauge the risk level of anomalies. That is, the trustworthiness of the location used to access the cloud service is used to upgrade or downgrade the risk level of the anomalies. In this manner, actions can be taken only on detected anomalies that are associated with non-trusted locations and therefore may be high risk. The trusted location detection system and method of the present invention can be advantageously applied to filter or reduce the number of detected cloud usage anomalies to anomalies associated with non-trusted locations that are potentially high risk. In this manner, analysis of remaining anomalies can be effectively and efficiently performed to determine the threat to the enterprise arising from these cloud service usage activities.

More specifically, the trusted location detection system and method implements geographic or physical location based threat detection for enterprise cloud service usage. The system and method analyzes the usage logs of the cloud based services and automatically determines primary or trusted locations associated with users of the enterprise. The trusted locations of the users of the enterprise are used to evaluate or filter out detected anomalies as anomalies associated with trusted locations can be deemed low risk. The trusted location detection system and method enables the identification of anomalies originating from non-trusted locations which may be of high risk to the enterprise.

In the present description, a "cloud-based service" or "cloud service" refers to computing resources, including hardware and software, that are delivered as a service over a data network. In most cases, the cloud service is deployed on the publicly available Internet. In embodiments of the present invention, the cloud-based service may also be deployed on a private data network of an enterprise, or be deployed on a third party private data network, or be deployed on a personal data network.

With the proliferation of cloud-based services, an enterprise may wish to adopt one or more cloud-based services for data storage or other applications. The users or employees of the enterprise may access the cloud-based services within or outside of the enterprise's own data network. In some cases, the enterprise may force network traffic between a client device and a cloud-based service to be re-directed through a network intermediary. However, in most cases, the users of the enterprise access the cloud-based services without going through the enterprise data network. Regardless of the access methods, the enterprise may wish to deploy security measures to monitor and control the use of the cloud-based services by the enterprise's employees and users. In embodiments of the present invention, the enterprise employs a cloud service usage security analysis system which implements a trusted location detection system and method for performing threat detection based on location-based analysis.

FIG. 1 is a diagram illustrating an environment in which a cloud service usage security analysis system of the present invention can be deployed in some embodiments. Referring to FIG. 1, an enterprise may adopt the use of one or more cloud-based services provided by cloud service providers (CSP) 30, such as CSP1, CSP2 and CSP3 shown in FIG. 1. The users or employees of the enterprise may access the cloud-based services on behalf of the enterprise from various physical locations 10. Furthermore, the users of the enterprise may access the cloud-based services directly, without going through the enterprise's own data network. In some cases, the enterprise may deploy a network intermediary 20 and configure the cloud service providers to force network traffic to be redirected through the network intermediary 20.

To ensure security associated with the use of one or more cloud based services, the enterprise employs control and security measures to detect and contain potential or actual threats to the enterprise's data being stored on the cloud service providers. In embodiments of the present invention, the enterprise employs the cloud service usage security analysis system 50 of the present invention to implement cloud usage threat prevention based on the physical locations from which access to the cloud service providers originate. More specifically, the cloud service usage security analysis system 50 is advantageously applied to detect, filter and annotate security incidents, anomalies and threats based on location heuristics.

Cloud service usage security analysis system 50 includes an activity monitoring system 60 configured to receive and process user activity logs from one or more of the cloud service providers 30. In particular, each cloud service provider 30 provides user activity logs containing network traffic data handled by the cloud service provider on behalf of the enterprise. In some examples, the cloud service usage security analysis system 50 obtains the user activity logs using an application program interface (API) of the cloud service provider. In some embodiments, the user activity logs contain information related to the locations from which the cloud service accesses were made, such as the IP addresses of the originating devices. The user activity logs may further contain information related to the service action being taken, such as upload file, download files, and modify files, and other related information such as the time of the access and the identification of the enterprise. The activity monitoring system 60 processes the user activity logs to generate cloud usage activity information for the enterprise associated one or more cloud service providers 30.

A salient feature of the cloud service usage security analysis system 50 of the present invention is that the trusted location analysis identifies trusted or non-trusted locations based primarily on cloud activity usage data and does not require user input. While user input can be made when desired, the cloud service usage security analysis system 50 operates automatically to identify trusted locations based on cloud usage data, with or without user input. User input of trusted or non-trusted locations can be a tedious process and user input data can be potentially unreliable as data input is prone to user error and may be susceptible to security risk, such as malicious intent to designate location as trusted.

In the present description, the term "location" refers to the physical location from which an access to the cloud service provider originates. The location is typically associated with the computing device used to make the cloud service access. The computing device may be a mobile device or a laptop computer or a desktop device. In the present description, the location is described as the user's location as it is assumed that a user is operating the computing device to make the cloud service access. Therefore, in the present description, the "location of the user" accessing the cloud service is synonymous with the "location of the computing device" used to access the cloud service.

Figure 4:
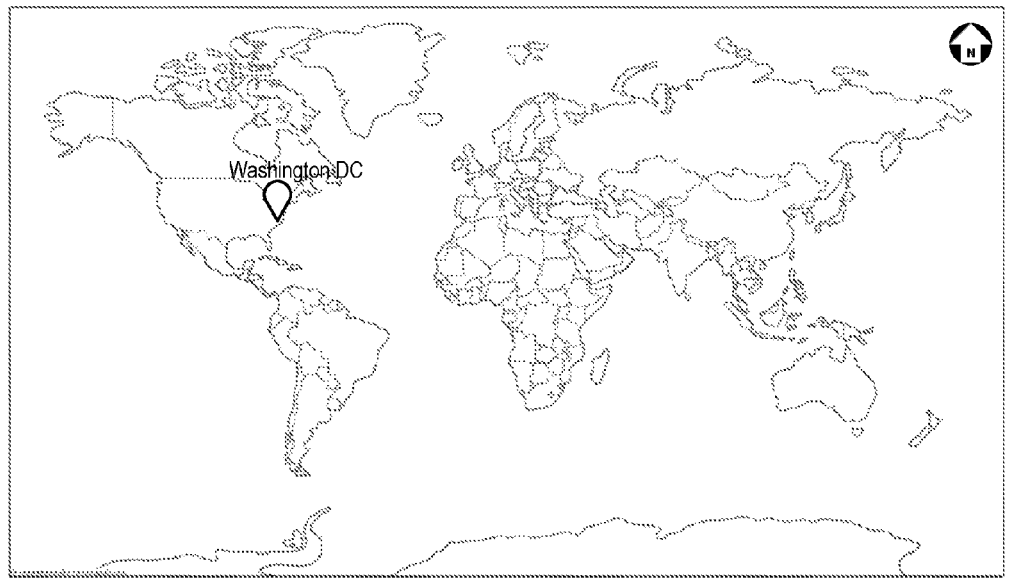
FIG. 4 illustrates a representation of a location using a map in some examples of the present invention.

In the present description, a "location" may be represented in a variety of ways, including as a set of GPS coordinates, as a post office mailing address, as an identification of a business or store, or other means of identifying a location. In some examples, a location is represented as one of the following formats: (1) City, State, Country (e.g. Sunnyvale, Calif., USA); (2) Country (USA); (3) a Geographic Coordinate system, such as Latitude and Longitude coordinates (e.g. 37.3175° N, 122.0419° W); and (4) a map representation, as shown in FIG. 4.

The cloud service usage security analysis system 50 further includes an anomaly detection system 80 configured to receive the cloud usage activity information from the activity monitoring system 60 and to detect for anomaly in the cloud usage activity information. More specifically, the anomaly detection system 80 detects for actions or activities at the cloud service providers that may indicate a security risk to the enterprise. In the present description, an anomaly in the cloud usage activity can include security incidents, anomalies, threats, and other potential or actual risks to the enterprise resulting from the use of cloud based services. The anomaly detection system 80 may apply one or more heuristics to the cloud usage activity information to determine if certain user cloud usage activity should be deemed a threat or a security risk to the enterprise's data.

The anomaly detection system 80 is capable of identifying activities that may be potential security threats. However, in some cases, a large number of anomalies may be detected. When anomaly detection system 80 reports a large number of detected anomalies, it may become too time consuming or too labor intensive to conduct further investigation of all of the detected anomalies. According to embodiments of the present invention, the anomaly detection system 80 implements location-based filtering of detected anomalies where detected anomalies associated with trusted locations are filtered or removed. Alternately, the anomaly detection system 80 implements location-based filtering to evaluate the risk level of the detected anomalies, to increase or decrease the risk level associated with the anomalies. More specifically, the anomalies are filtered based on the locations from which accesses to the cloud service providers were made. In some examples, when an access to the cloud service was made from a location that is designated as a trusted location, any anomaly associated with that access can be deemed low risk and can be filtered or removed from the detected anomalies. Alternately, the risk level of an anomaly associated with a trusted location can be downgraded. In this manner, the number of suspected anomalies detected can be reduced and the anomaly detection system 80 can report only on detected anomalies that are associated with locations that are designated as non-trusted. Those detected anomalies can then be further investigated for compliance with the enterprise's security policy.

In embodiments of the present invention, the cloud service usage security analysis system 50 includes a trusted location detection system 70 in communication with a trusted location registry 90. In some embodiments, the trusted location detection system 70 may be further in communication with a black-listed location registry 95. The trusted location registry 90 stores previously identified trusted locations for users of the enterprise. During the operation of the trusted location detection system 70, the trusted location detection system 70 may determine that one or more locations being used to access the cloud service providers are to be trusted for certain users and will add those trusted locations to the trusted location registry 90 for storage. The blacklisted location registry 95 stores previously identified blacklist locations which are deemed to be non-trusted locations. The blacklist locations can be designated by the enterprise as locations from which cloud usage activities should never be trusted. The blacklist locations can be designated as being non-trusted locations for all users of the enterprise or only for a certain group of users. In some embodiments, the blacklist locations can be countries or geographic regions that have been deemed high risk or where access restriction is desired.

The trusted location detection system 70 is configured to receive the cloud usage activity information from the activity monitoring system 60 and detect for trusted locations in the cloud usage activity information. The trusted location detection system 70 provides to the anomaly detection system 80 a determination of trusted or non-trusted for each location identified in the cloud usage activity information. In this manner, the anomaly detection system 80 can filter or remove detected anomalies that are associated with trusted locations. In some embodiments, the anomaly detection system 80 may generate alerts or reports of the detected anomalies. By implementing location-based filtering, the anomaly detection system 80 may report only on anomalies that are associated with non-trusted locations.

Figure 2:
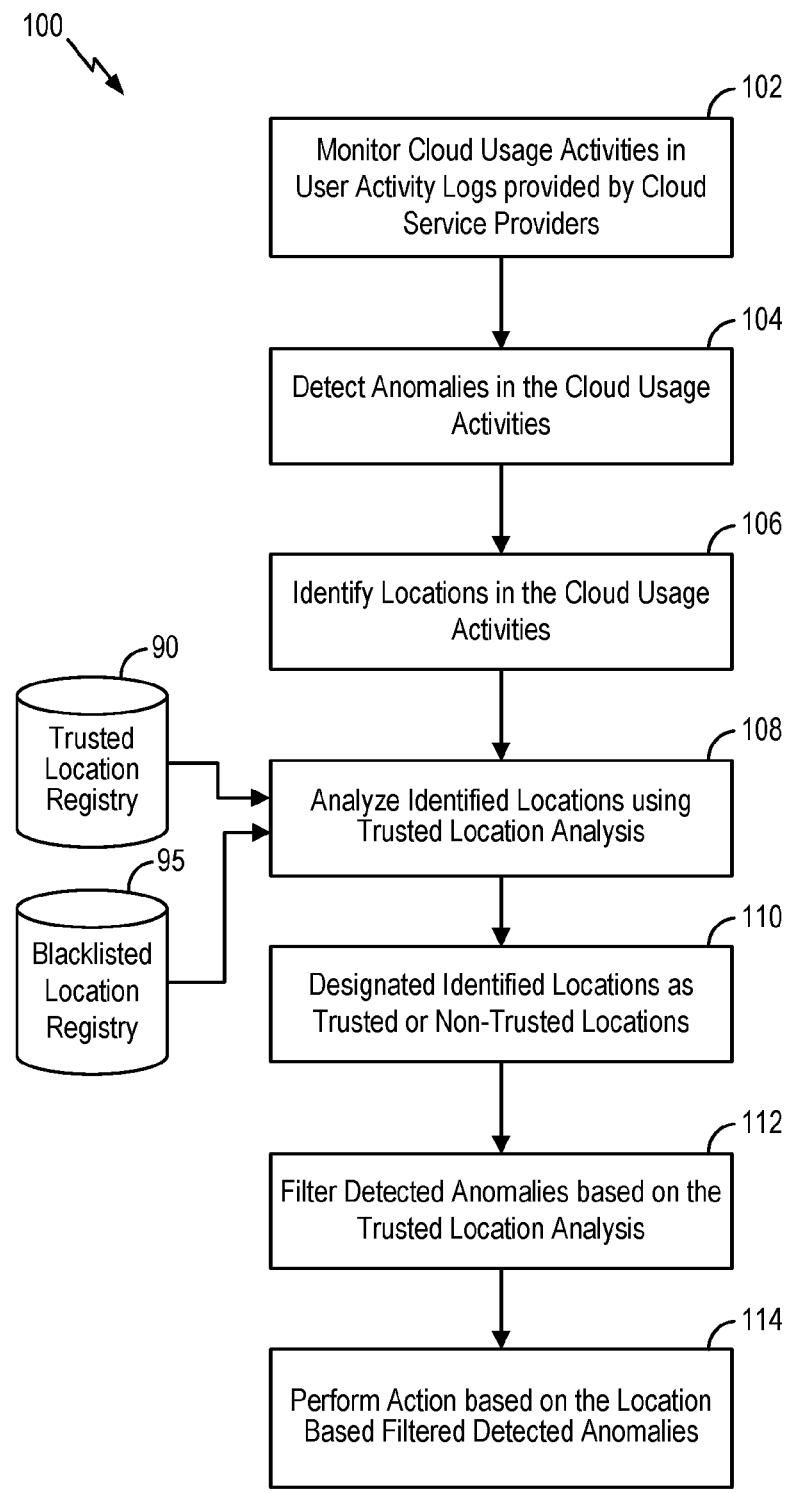
FIG. 2 is a flowchart illustrating a cloud activity anomaly detection method using location-based filtering according to embodiments of the present invention.

FIG. 2 is a flowchart illustrating a cloud activity anomaly detection method using location-based filtering according to embodiments of the present invention. The cloud activity anomaly detection method of FIG. 2 can be implemented in the cloud security analysis system 50 of FIG. 1 in embodiments of the present invention. In some embodiments, the cloud activity anomaly detection method 100 is implemented as software executed on a hardware processor or a microprocessor in a computing device. Referring to FIG. 2, the cloud activity anomaly detection method 100 monitors cloud usage activities in the user activity logs received from one or more of the cloud service providers (102). The user activity logs contain information on activities of users accessing the cloud-based service on behalf of the enterprise. The method 100 detects anomalies in the cloud usage activities where the anomalies indicates potential security risk associated with usage activities at the cloud-based service (104). The method 100 then identifies locations in the cloud usage activities (106). The locations may be identified only for cloud usage activities associated with detected anomalies. The locations may also be identified for most or all of the cloud usage activities. The "locations" described herein refer to the physical location from which the users accessed the cloud-based service on behalf of the enterprise. In some embodiments, the method 100 determines the locations in the cloud usage activities by identifying IP addresses in the user activity logs. In one example, a physical location may be identified from an IP address by using IP-based geo-location.

The method 100 then performs a trusted location analysis using a trusted location registry 90 on each of the identified locations to designate each location as a trusted location or a non-trusted location (108). In some embodiments, the method 100 also uses a blacklisted location registry 95 providing a list of blacklist locations that are to be designated as non-trusted. The method 100 designates each identified location as a trusted location or non-trusted location (110). The method 100 then filters the detected anomalies to remove anomalies having locations designated as trusted locations (112). In some embodiments, the method 100 filters the detected anomalies by downgrading or lowering the risk level of the detected anomalies having locations designated as trusted locations and upgrading or raising the risk level of the detected anomalies having locations designated as non-trusted locations. Finally, the method 100 performs an action based on the filtered detected anomalies having locations designated as non-trusted locations (114). In some examples, the method 100 may generate reports or alerts based on the filtered detected anomalies. In other examples, the method 100 generates the reports or alerts to inform the enterprise about the risk associated with using a specific cloud service provider.

With the use of the cloud activity anomaly detection method of the present invention, security incident, anomaly and threat risk, identified from the cloud usage data, is modulated using the location analysis along with other parameters to make the risk rating of the security incident reactive and contextual. That is, the security incidents or anomalies reported will be analyzed against the trusted locations so that the risk rating for the security incident is relevant to the actual risk exposure.

Figure 3:
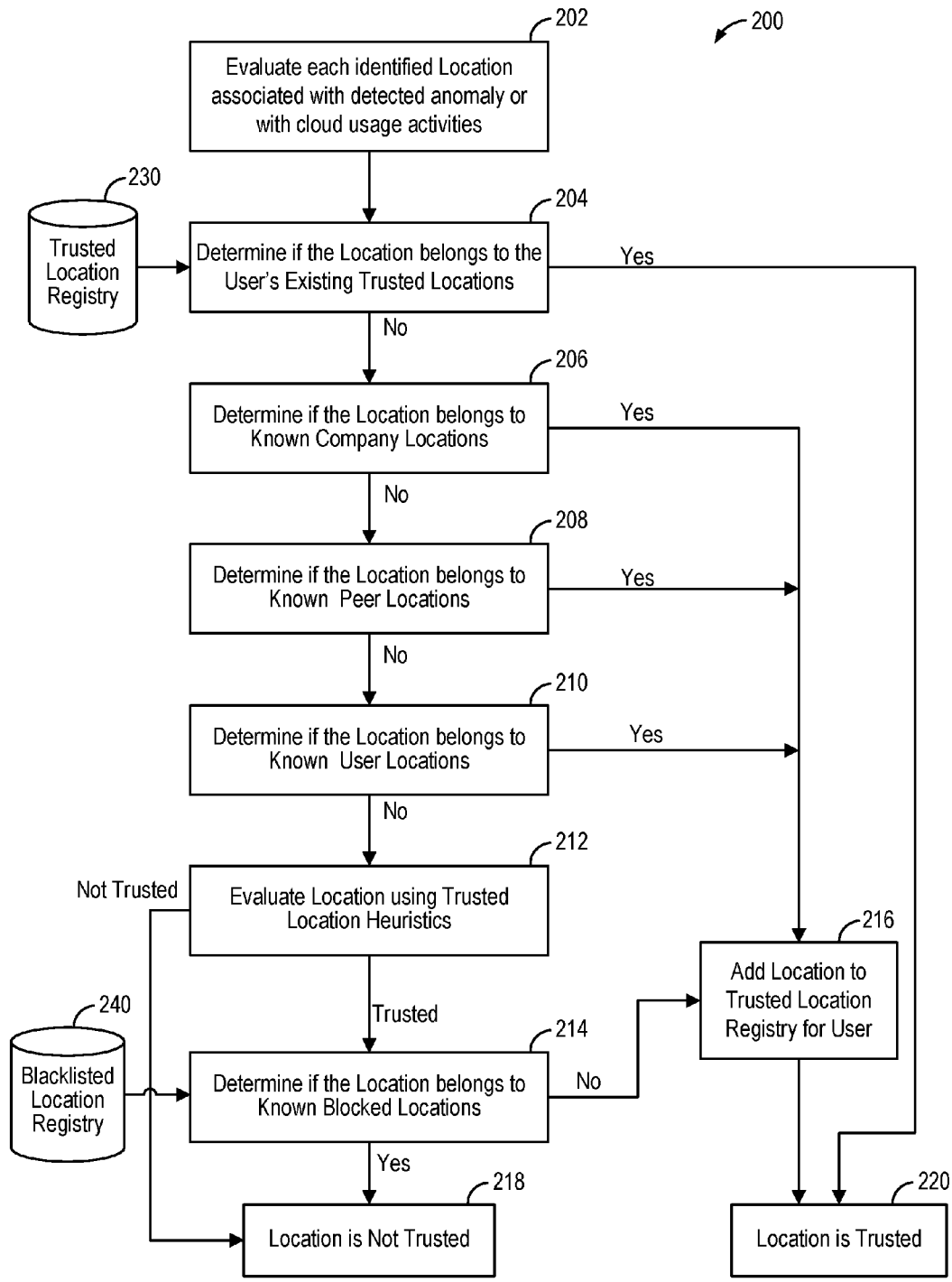
FIG. 3 is a flowchart illustrating a trusted location analysis method in embodiments of the present invention.

FIG. 3 is a flowchart illustrating a trusted location analysis method in embodiments of the present invention. The trusted location analysis method of FIG. 3 may be implemented in the trusted location detection system of FIG. 1 in some embodiments. Referring to FIG. 3, the trusted location analysis method 200 evaluates each identified location associated with detected anomalies or with the cloud usage activities (202). Each identified location is associated with a user or a computing device the user used to access the cloud service provider.

The method 200 access the trusted location registry 90 which contains previously identified trusted locations associated with users of the enterprise. The previously identified trusted locations are also referred to as the existing trusted locations for the user. In some examples, each user of the enterprise may be associated with a set of existing trusted locations, such as five existing trusted locations for each user. The entries in the trusted location registry 90 may be empty at the start of the operation and the trusted locations for each user can be populated as the trusted location analysis method is being executed to evaluate locations from cloud usage activities. Overtime, users of the enterprise will be associated with one or more existing trusted locations.

For the identified location associated with a user, the method 200 determine whether the identified location matches one of the existing trusted locations for the user in the trusted location registry (204). In response to the determination that the identified location matches one of the existing trusted locations for the user, the method 200 designates the identified location as a trusted location (220).

In response to the determination that the identified location does not match the existing trusted locations for the user in the trusted location registry, the method 200 determines whether the identified location matches one of known locations associated with the enterprise, the user, or peers of the user associated with the enterprise. The method 200 operates on the cloud usage activity data to detect locations that can be deemed a company location, a peer location or a user location. The detection of these known locations is performed automatically by the method 200, without requiring a system administrator to enter a list of the known locations.

In particular, at 206, the method 200 determines if the identified location belongs to a known Company location (206). In the present description, a "company location" refers to previously identified physical locations where a given number of the users or employees of the enterprise have used to access the cloud service provider. In embodiments of the present invention, the "Company location" as used herein does not refer to the corporate headquarter address or the company office address. Rather the Company location is determined by automatic detection of a location where users or employees of the enterprise congregates or have used to access the cloud service provider. The trusted location analysis method 200 may determine when a large number of employees of the enterprise are accessing a given cloud service provider from the same location, then that location can be deemed a Company location.

For example, multiple employees of an enterprise may visit a customer's site and access a cloud service from the customer's site. The trusted location analysis method 200 will recognize the customer's site as a known Company location. In another example, an enterprise may move its headquarters. The enterprise does not need to update the known Company location in the trusted location analysis method. Rather, the trusted location analysis method will automatically detect that at location W, a large number of the enterprise's users are now accessing the cloud service provider. The trusted location analysis method will then designate location W as a known Company location.

If the identified location is determined to be a known Company location, the method 200 adds the identified location to the trusted location registry for the user (216) and the location is designated as a trusted location (220).

If the identified location does not match a known Company location, the method 200 determines if the identified location belongs to a known Peer location (208). In the present description, a "peer location" refers to previously identified physical locations where users of the enterprise that are peers to the user have used to access the cloud-based service. In some example, a peer location is a location used by many of the enterprise's employees to access the cloud service. For example, ABC coffee house near the enterprise's office may be frequented by employees of the enterprise and cloud usage activities from multiple users have been detected at this location. ABC coffee house can then be designated as a known Peer location.

If the identified location is determined to be a known Peer location, the method 200 adds the identified location to the trusted location registry for the user (216) and the location is designated as a trusted location (220). For example, user A has visited client site ABC Co. and assessed a cloud-based service from client site ABC Co. Then, user B, a peer or co-worker of user A, visited client site ABC Co. Client site ABC Co. may not be an existing trusted location for user B or a known Company location. However, client site ABC Co. may be deem a known peer location for user B as user A has used the same location. Client site ABC Co. will then be added to user B's existing trusted locations.

If the identified location does not match a known Peer location, the method 200 determines if the identified location belongs to a known User location (210). In the present description, a "user location" refers to physical locations that have been identified as being associated with the user. In other words, the known user location can be a known prior user location. For example, the known user locations can include a home location of the user, a frequently visited location of the user, such as a coffee shop or a library.

If the identified location is determined to be a known User location, the method 200 adds the identified location to the trusted location registry for the user (216) and the location is designated as a trusted location (220).

If the identified location does not match a known User location, the method 200 evaluates the identified location using a set of trusted location heuristics (212). The trusted location heuristics evaluate the identified location based on a set of factors to determine if the location should be trusted or not trusted. In some examples, the trusted location heuristics evaluates the nature of the data network being used to access the cloud based service, including identifying the data network as a private data network or a public data network. The trusted location heuristics may evaluate the type of computing device being used to access the cloud service, such as a laptop computer or a mobile device. The trusted location heuristics can further evaluate the cloud activity pattern, the network activity and the activity of the peers of the users.

For example, the trusted location heuristics may evaluate if the user is at a location with other users of the enterprise. If user A access a cloud service provider from location P and the cloud usage activities indicate users B, C and D were also at the same location accessing the same or a different cloud service providers, then the trusted location heuristics may determine that location P is a trusted location for user A and no anomaly needs to be flagged.

In another example, user A is accessing a cloud service provider at a location T through a private data network and using the company laptop computer. The cloud usage activities indicate other employees of the enterprise have accessed from this location already. The trusted location heuristics may determine that location T is a trusted location.

In some embodiments, the trusted location heuristics evaluate the identified location to determine if the location is a trusted location of the enterprise's vendors or business partners. If the identified location is a trusted location for the enterprise's vendors or business partners, then the identified location can be deemed a trusted location for the user. In yet other embodiments, the trusted location heuristics evaluate the identified location to determine if the location is a trusted location of any other enterprises. For example, the cloud security analysis system may be configured as a multi-tenant service and therefore may contain trusted location data for other enterprises which are tenants of the cloud security analysis system. The trusted location heuristics can evaluate the identified location in view of the trusted locations of other tenants of the cloud security analysis system. The identified location can be deemed a trusted location if it is one of the trusted locations associated with the other tenants of the cloud security analysis system.

In some further embodiments, the trusted location analysis method 200 maintains a list of on-premises locations mapped to IP addresses. The IP addresses are internal IP addresses of an enterprise and can be used to identify and track computing devices that are on the premises of the enterprise. In some embodiment, the trusted location analysis method maintains an IP address annotated location map for an enterprise. The trusted location analysis method may use the IP address annotated location map to track the use of on-site computing devices to detect for unauthorized access. In one example, the enterprise can track the activities of its employees within the premises of the enterprise for suspicious or unauthorized activities associated with using the on-site computing devices. In another example, the enterprise can determine if a user has attempted access to certain sensitive computing machines on the premises of the enterprise.

In some examples, the trusted location analysis method 200 evaluates the identified location of the user using the set of trusted location heuristics including the IP address annotated location map of the enterprise. The trusted location analysis method evaluates the identified location to determine if the location is a trusted location for the user using the IP address annotated location map for the enterprise. In one example, the identified location may be deemed trusted if the IP address indicates a location in the location map where the user has authorized access. In another example, the identified location may be deemed trusted if the IP address indicates a location in the location map where the user's peer group has authorized access. Accordingly, the identified location can be designated a trusted location for the user.

In the event that the trusted location heuristics determines the identified location as being a non-trusted location, the method 200 designates the location as a non-trusted location (218).

In the event that the trusted location heuristics determine the location is to be trusted, the method 200 may further determine if the location belongs to a set of known blacklisted or known blocked locations (214). If the identified location is not blacklisted, then the method 200 adds the identified location to the trusted location registry for the user (216) and the location is designated as a trusted location (220). If the identified location is blacklisted, then the location is designated as not trusted (218).

It is instructive to note that the order of the evaluations described in method 200 is not critical and different order may be used to evaluate the identified location. For example, the order of evaluating the identified location as a known Company location, a known Peer location, and a known User location is not critical and may be performed in any order. Furthermore, the determination of the identified location as a blacklist location can be performed in earlier steps to identify locations that are already designated as blocked and so no further analysis is necessary. Finally, in some embodiments, the trusted location analysis method may perform one or more of the evaluations alone. That is, the trusted location analysis method does not require all of the evaluations to be implemented in all cases. In some examples, the trusted location analysis method may perform evaluations using only known Company location and known User location, without the use of known Peer location. In other examples, the trusted location analysis method may perform evaluations using just some or all of the trusted location heuristics. For example, the trusted location analysis method may perform evaluations using only the IP address annotated location map to detect for unauthorized access within the enterprise's premises.

The trusted location analysis method 200 thus determines for each location a trusted or non-trusted designation. The trusted or non-trusted location designation can be used by the anomaly detection system 80 to perform location-based filtering of detected anomalies in the cloud usage activities. The anomaly detection system 80 is capable of reducing the amount of detected anomalies by providing detected anomalies for non-trusted locations only.

A salient feature of the trusted location detection system and method is the automatic and data-driven detection of trusted and untrusted locations. That is, the trusted location detection system and method automatically determines company locations, peer locations and user locations as known locations and the trusted locations for the users are dynamically updated. The trusted location detection system and method does not rely on a human interface to specify or enter the known company, peer or user locations. Furthermore, the location detection is dynamic in nature where a user's list of trusted location can be expanded as additional locations where the user accessed cloud services are deemed to be trusted. In this manner, no human intervention is required to update the list of trusted locations for each user of the enterprise. Rather, the trusted locations are learned as the cloud security analysis system operates over time to add trusted locations for the users.

In other embodiments, the trusted location analysis method may be configured to designate certain users as not having any trusted locations. For example, a salesperson at a company may be designated as someone who will not have any trusted locations. In that case, the trusted location analysis method will not store any trusted location for the user but instead will evaluate each identified location associated with the user for trusted or non-trusted designation using the known location analysis and the trusted location heuristics. In some embodiments, a user may be designated to have no trusted location beyond the known Company locations. The user will only have locations that match the known Company locations stored in the trusted location registry. Otherwise, the trusted location analysis method will not store any other trusted location for the user but instead will evaluate each identified location associated with the user for trusted or non-trusted designation using the known location analysis and the trusted location heuristics.

In the above description, the cloud security analysis system uses the trusted/non-trusted location determination to filter out detected anomalies. As described above, the anomaly detection system may use the trusted/non-trusted location determination to remove detected anomalies or to reduce the number of detected anomalies. In other embodiments, the anomaly detection system may also use the trusted/non-trusted location determination to evaluate or gauge the risk level of the detected anomalies. That is, the anomaly detection system assesses a risk level of an anomaly detected from the user activity logs based on various factors. The anomaly detection system may then adjust the risk level using the location based analysis. The risk level of a detected anomaly may be downgraded or lowered for a user location that is designated as a trusted location. Alternately, the risk level of a detected anomaly may be upgraded or raised for a user location that is designated as a non-trusted location. The anomaly detection system is therefore configured to evaluate the risk level of detected anomaly based on the trusted location analysis and in conjunction with other risk factors. The final risk analysis may result in the detected anomaly being reported as a risk alert or the detected anomaly being filtered out as a low risk anomaly. More specifically, the anomaly detection system may generate reports and alerts for detected anomalies having a risk level above a given threshold, where the risk level is determined based on the trusted location analysis and in conjunction with other risk factors.

According to another aspect of the present invention, the cloud security analysis system 50 is further configured to analysis cloud usage security risk across multiple cloud service providers being used by the enterprise. In one embodiment, the cloud security analysis system 50 analyzes cloud usage activities across multiple cloud service providers and detects anomalies based on the geographic locations of cloud usage activities of a user across multiple cloud service providers. For example, the anomaly detection system 80 may detect that a user accessed a cloud service provider in the United States and around the same time also accessed a cloud service provider from Turkey. The cloud activities from two disparate geographic locations (United States vs. Turkey) within an unreasonable short time period indicate a possible security breach. The anomaly detection system 80 may generate risk alerts based on such geographic location determination.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of filtering detected anomalies in usage activities at a cloud-based service associated with users of an enterprise, the method comprising:
    monitoring, using a hardware processor, cloud usage activities from activity logs of users accessing the cloud-based service on behalf of the enterprise;
    detecting, using the hardware processor, a plurality of anomalies in the usage activities from the activity logs, the anomalies indicating potential security risk associated with usage activities at the cloud-based service;
    identifying from the cloud usage activities, using the hardware processor, a plurality of locations from which the users accessed the cloud-based service on behalf of the enterprise, the locations being physical locations;
    performing, using the hardware processor, a trusted location analysis using a trusted location registry on each of the plurality of identified locations to designate each location as a trusted location or a non-trusted location;
    filtering the plurality of detected anomalies based on the identified locations being designated as a trusted location or a non-trusted location; and
    performing an action based on the filtered detected anomalies, comprising generating reports or alerts based on the filtered detected anomalies having locations designated as non-trusted locations,
    wherein performing the location-based analysis using the trusted location registry on each of the plurality of locations to designate each location as a trusted location or a non-trusted location comprises:
        accessing the trusted location registry containing existing trusted locations associated with the users;
        for each identified location used by a user, determining whether the identified location matches one of the existing trusted locations for the user in the trusted location registry;
        in response to the determining that the identified location matches the existing trusted locations for the user in the trusted location registry, designating the identified location as a trusted location;
        in response to the determining that the identified location does not match the existing trusted locations for the user in the trusted location registry, determining whether the identified location matches one of known locations associated with the enterprise, the user, or peers of the user associated with the enterprise;
        in response to the determining that the identified location matches the known locations, designating the identified location as a trusted location and adding the identified location to the trusted location registry as an existing trusted location for the user;
        in response to the determining that the identified location does not matched the known locations, evaluating the identified location using one or more trusted location criteria to designate the identified location as a trusted location or a non-trusted location;
        in response to the evaluating that the identified location is a trusted location, designating the identified location as a trusted location and adding the identified location to the trusted location registry as an existing trusted location for the user; and
        in response to the evaluating that the identified location is not a trusted location, designating the identified location as a non-trusted location.

2. The method of claim 1, wherein identifying in the activity logs a plurality of locations comprises:
    identifying a plurality of IP addresses in the activity logs; and
    determining a location associated with each IP address using IP-based geolocation.

3. The method of claim 1, wherein determining whether the identified location matches one of known locations associated with the enterprise, the user, or peers of the user associated with the enterprise comprises:
    determining whether the identified location matches one of known company locations associated with the enterprise, the known company locations being previously identified physical locations where a given number of the users of the enterprise have used to access the cloud-based service.

4. The method of claim 1, wherein determining whether the identified location matches one of known locations associated with the enterprise, the user, or peers of the user associated with the enterprise comprises:
    determining whether the identified location matches one of known user locations associated with the user, the known user locations being physical locations that have been previously identified as being associated with the user, the known user locations comprising a home location of the user or a frequently visited location of the user.

5. The method of claim 1, wherein determining whether the identified location matches one of known locations associated with the enterprise, the user, or peers of the user associated with the enterprise comprises:
    determining whether the identified location matches one of known peer locations associated with the enterprise, the known peer locations being previously identified physical locations where users of the enterprise that are peers to the user have used to access the cloud-based service.

6. The method of claim 1, wherein evaluating the identified location using one or more trusted location criteria comprises:
    evaluating the identified location to determine the nature of the data network being used to access the cloud based service, including identifying the data network as a private data network or a public data network.

7. The method of claim 1, further comprising:
accessing a blacklisted location registry containing blocked locations associated with the enterprise;
in response to the determining that the identified location is a trusted location based on analysis using the one or more trusted location criteria, determining whether the identified location matches one of the blocked locations from the blacklisted location registry;
in response to the determining that the identified location matches one of the blocked locations from the blacklisted location registry, designating the identified location as a non-trusted location.

8. The method of claim 1, further comprising:
maintaining a list of on-premises locations of the enterprise mapped to IP addresses;
for each identified location used by a user, determining whether the identified location matches one of the on-premises locations;
in response to the determining that the identified location matches an on-premises location, determining whether the identified location is an authorized location for the user;
in response to the determining that the identified location is an authorized location for the user, designating the identified location as a trusted location and adding the identified location to the trusted location registry as an existing trusted location for the user;
in response to the determining that the identified location is not an authorized location for the user, designating the identified location as a non-trusted location.

9. The method of claim 8, wherein maintaining a list of on-premises locations of the enterprise mapped to IP addresses comprises:
maintaining an IP address annotated location map listing the on-premises locations of the enterprise mapped to IP addresses.

10. The method of claim 1, wherein filtering the plurality of detected anomalies based on the identified locations being designated as a trusted location or a non-trusted location comprises:
filtering the plurality of detected anomalies to remove anomalies having locations designated as trusted locations.

11. The method of claim 10, wherein performing an action based on the filtered detected anomalies comprises:
performing an action based on the filtered detected anomalies having locations designated as non-trusted locations; and
providing an output containing the one or more filtered detected anomalies having locations designated as non-trusted locations.

12. The method of claim 1, wherein detecting a plurality of anomalies in the usage activities from the activity logs comprises assessing a risk level for each detected anomaly; and filtering the plurality of detected anomalies based on the identified locations being designated as a trusted location or a non-trusted location comprises:
lowering the risk level of a detected anomaly in response to the identified location being designated as a trusted location; and
raising the risk level of a detected anomaly in response to the identified location being designated as a non-trusted location.

13. The method of claim 12, wherein performing an action based on the filtered detected anomalies comprises:
performing an action based on the risk level determined for the filtered detected anomalies; and
providing an output containing the one or more filtered detected anomalies having risk levels above a given threshold level.

14. A system for filtering detected anomalies in usage activities at a cloud-based service associated with users of an enterprise, comprising:
a computer processor configured to:
monitor cloud usage activities from activity logs of users accessing the cloud-based service on behalf of the enterprise;
detect a plurality of anomalies in the usage activities from the activity logs, the anomalies indicating potential security risk associated with usage activities at the cloud-based service;
identifying from the cloud usage activities a plurality of locations from which the users accessed the cloud-based service on behalf of the enterprise, the locations being physical locations;
perform a trusted location analysis using a trusted location registry on each of the plurality of identified locations to designate each location as a trusted location or a non-trusted location;
filter the plurality of detected anomalies based on the identified locations being designated as a trusted location or a non-trusted location;
perform an action based on the filtered detected anomalies, comprising generating reports or alerts based on the filtered detected anomalies having locations designated as non-trusted locations; and
a memory coupled to the processor and configured to provide the processor with instructions,
wherein the computer processor is further configured to:
access the trusted location registry containing existing trusted locations associated with the users;
for each identified location used by a user, determine whether the identified location matches one of the existing trusted locations for the user in the trusted location registry;
in response to the determining that the identified location matches the existing trusted locations for the user in the trusted location registry, designate the identified location as a trusted location;
in response to the determining that the identified location does not match the existing trusted locations for the user in the trusted location registry, determine whether the identified location matches one of known locations associated with the enterprise, the user, or peers of the user associated with the enterprise;
in response to the determining that the identified location matches the known locations, designate the identified location as a trusted location and adding the identified location to the trusted location registry as an existing trusted location for the user;
in response to the determining that the identified location does not matched the known locations, evaluate the identified location using one or more trusted location criteria to designate the identified location as a trusted location or a non-trusted location;
in response to the evaluating that the identified location is a trusted location, designate the identified location as a trusted location and adding the identified location to the trusted location registry as an existing trusted location for the user; and
in response to the evaluating that the identified location is not a trusted location, designate the identified location as a non-trusted location.

15. The system of claim 14, wherein the processor is further configured to filter the plurality of detected anomalies to remove anomalies having locations designated as trusted locations.

16. The system of claim 14, wherein the processor is further configured to:
   assess a risk level for each detected anomaly;
   lower the risk level of a detected anomaly in response to the identified location being designated as a trusted location; and
   raise the risk level of a detected anomaly in response to the identified location being designated as a non-trusted location.

17. A computer program product for filtering detected anomalies in usage activities at a cloud-based service associated with users of an enterprise, the computer program product being embodied in a tangible and non-transitory computer readable storage medium and comprising computer instructions for:
   monitoring cloud usage activities from activity logs of users accessing the cloud-based service on behalf of the enterprise;
   detecting a plurality of anomalies in the usage activities from the activity logs, the anomalies indicating potential security risk associated with usage activities at the cloud-based service;
   identifying from the cloud usage activities a plurality of locations from which the users accessed the cloud-based service on behalf of the enterprise, the locations being physical locations;
   performing a trusted location analysis using a trusted location registry on each of the plurality of identified locations to designate each location as a trusted location or a non-trusted location;
   filtering the plurality of detected anomalies based on the identified locations being designated as a trusted location or a non-trusted location; and
   performing an action based on the filtered detected anomalies, comprising generating reports or alerts based on the filtered detected anomalies having locations designated as non-trusted locations,
   wherein the computer program product further comprises computer instructions for:
      accessing the trusted location registry containing existing trusted locations associated with the users;
      for each identified location used by a user, determining whether the identified location matches one of the existing trusted locations for the user in the trusted location registry;
      in response to the determining that the identified location matches the existing trusted locations for the user in the trusted location registry, designating the identified location as a trusted location;
      in response to the determining that the identified location does not match the existing trusted locations for the user in the trusted location registry, determining whether the identified location matches one of known locations associated with the enterprise, the user, or peers of the user associated with the enterprise;
      in response to the determining that the identified location matches the known locations, designating the identified location as a trusted location and adding the identified location to the trusted location registry as an existing trusted location for the user;
      in response to the determining that the identified location does not matched the known locations, evaluating the identified location using one or more trusted location criteria to designate the identified location as a trusted location or a non-trusted location;
      in response to the evaluating that the identified location is a trusted location, designating the identified location as a trusted location and adding the identified location to the trusted location registry as an existing trusted location for the user; and
      in response to the evaluating that the identified location is not a trusted location, designating the identified location as a non-trusted location.

18. The computer program product of claim 17, further comprising computer instructions for filtering the plurality of detected anomalies to remove anomalies having locations designated as trusted locations.

19. The computer program product of claim 17, further comprising computer instructions for:
   assessing a risk level for each detected anomaly;
   lowering the risk level of a detected anomaly in response to the identified location being designated as a trusted location; and
   raising the risk level of a detected anomaly in response to the identified location being designated as a non-trusted location.

* * * * *